US011256095B2

(12) United States Patent
Tinch et al.

(10) Patent No.: US 11,256,095 B2
(45) Date of Patent: Feb. 22, 2022

(54) REFLECTIVE SWITCHING DEVICE FOR INPUTTING DIFFERENT WAVELENGTHS OF LIGHT INTO WAVEGUIDES

(71) Applicant: Magic Leap, Inc., Plantation, FL (US)

(72) Inventors: David Tinch, Laramie, WY (US); William K. Jones, Ft. Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/735,306

(22) Filed: Jan. 6, 2020

(65) Prior Publication Data
US 2020/0249482 A1 Aug. 6, 2020

Related U.S. Application Data

(63) Continuation of application No. 15/445,827, filed on Feb. 28, 2017, now Pat. No. 10,571,693.
(Continued)

(51) Int. Cl.
*G02B 27/01* (2006.01)
*G02B 6/35* (2006.01)
(Continued)

(52) U.S. Cl.
CPC ....... *G02B 27/0172* (2013.01); *G02B 6/3518* (2013.01); *G02B 6/005* (2013.01); *G02B 6/0076* (2013.01); *G02B 26/0833* (2013.01); *G02B 2027/0112* (2013.01); *G02B 2027/0125* (2013.01); *G02B 2027/0127* (2013.01); *G02B 2027/0185* (2013.01)

(58) Field of Classification Search
CPC ... G02B 27/01–0189; G02B 2027/0105–0198; G03B 21/00–64; H04N 9/31–3197
See application file for complete search history.

(56) References Cited

U.S. PATENT DOCUMENTS 6,850,221 B1   2/2005   Tickle
8,950,867 B2   2/2015   Macnamara
(Continued)

FOREIGN PATENT DOCUMENTS

CN   102375180 A   3/2012
CN   103827714 A   5/2014
(Continued)

OTHER PUBLICATIONS

European Extended Search Report, re EP Application No. 17760652.2, dated Oct. 8, 2019.
(Continued)

*Primary Examiner* — Michelle M Iacoletti
*Assistant Examiner* — Christopher A Lamb, III
(74) *Attorney, Agent, or Firm* — Knobbe, Martens, Olson & Bear, LLP

(57) ABSTRACT

Systems and methods are provided for selectively incoupling light having different wavelengths into one of a plurality of waveguides. The systems and methods provided for selectively incoupling light having different wavelengths into one of a plurality of waveguides comprise a switching device comprising switchable reflective elements that can be configured to redirect incoming light towards an incoupling element associated with one of a plurality of waveguides.

20 Claims, 12 Drawing Sheets

Related U.S. Application Data

(60) Provisional application No. 62/302,090, filed on Mar. 1, 2016.

(51) Int. Cl.
*F21V 8/00* (2006.01)
*G02B 26/08* (2006.01)

(56) References Cited

U.S. PATENT DOCUMENTS

| | | | |
|---|---|---|---|
| 9,081,426 | B2 | 7/2015 | Armstrong |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,571,693 | B2 | 2/2020 | Tinch et al. |
| 2003/0198429 | A1* | 10/2003 | Dho ............... G02B 6/262 385/18 |
| 2004/0130680 | A1 | 7/2004 | Zhou et al. |
| 2005/0018957 | A1 | 1/2005 | Aksyuk et al. |
| 2005/0089277 | A1 | 4/2005 | Ishida |
| 2006/0028436 | A1 | 2/2006 | Armstrong |
| 2007/0081123 | A1 | 4/2007 | Lewis |
| 2007/0252954 | A1 | 11/2007 | McGuire, Jr. et al. |
| 2008/0284988 | A1* | 11/2008 | Kobayashi ............ G03B 21/28 353/99 |
| 2009/0009752 | A1 | 1/2009 | Duggan et al. |
| 2011/0182469 | A1 | 7/2011 | Ji et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0088780 | A1 | 4/2013 | Jarvenpaa et al. |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0003762 | A1* | 1/2014 | Macnamara ........... G02B 6/262 385/8 |
| 2014/0049983 | A1 | 2/2014 | Nichol et al. |
| 2014/0071539 | A1 | 3/2014 | Gao |
| 2014/0140654 | A1 | 5/2014 | Brown et al. |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0300966 | A1* | 10/2014 | Travers ............... G03H 1/2205 359/558 |
| 2014/0306866 | A1 | 10/2014 | Miller et al. |
| 2014/0380249 | A1 | 12/2014 | Fleizach |
| 2015/0001677 | A1 | 1/2015 | Abovitz et al. |
| 2015/0009220 | A1 | 1/2015 | Wu |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0241614 | A1* | 8/2015 | Ide ............... G02B 6/00 359/204.4 |
| 2015/0241704 | A1 | 8/2015 | Schowengerdt et al. |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0033755 | A1 | 2/2016 | Horie et al. |
| 2017/0092232 | A1* | 3/2017 | Mullins ............... G09G 5/006 |
| 2017/0235142 | A1 | 8/2017 | Wall et al. |
| 2018/0299678 | A1 | 10/2018 | Singer et al. |

FOREIGN PATENT DOCUMENTS

| | | |
|---|---|---|
| CN | 104254797 A | 12/2014 |
| CN | 104865760 A | 8/2015 |
| CN | 104965348 A | 10/2015 |
| JP | 2003-029173 A | 1/2003 |
| JP | 2003-344787 A | 12/2003 |
| JP | 2006-162981 A | 6/2006 |
| JP | 2007-333812 A | 12/2007 |
| WO | WO 2017/151670 | 9/2017 |

OTHER PUBLICATIONS

Invitation to Pay Additional Fees and, Where Applicable, Protest Fee for PCT Application No. PCT/US17/20029, dated Apr. 28, 2017.
International Search Report and Written Opinion for PCT Application No. PCT/US17/20029, dated Jun. 28, 2017.
International Preliminary Report on Patentability for PCT Application No. PCT/US17/20029, dated Sep. 4, 2018.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
U.S. Appl. No. 15/445,827, filed Feb. 28, 2017, U.S. Pat. No. 10,571,693.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

REFLECTIVE SWITCHING DEVICE FOR INPUTTING DIFFERENT WAVELENGTHS OF LIGHT INTO WAVEGUIDES

INCORPORATION BY REFERENCE

This application is a continuation of U.S. application Ser. No. 15/445,827 filed on Feb. 28, 2017, entitled "REFLECTIVE SWITCHING DEVICE FOR INPUTTING DIFFERENT WAVELENGTHS OF LIGHT INTO WAVEGUIDES," which claims the priority benefit of U.S. Provisional Patent Application No. 62/302,090 filed on Mar. 1, 2016 U.S., entitled "MEMS Switching Device," the entirety of which is incorporated by reference herein in its entirety.

BACKGROUND

Field

The present disclosure relates to devices with microelectromechanical systems (MEMS) mirrors for use in optical systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" "virtual content" such as a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR technology.

SUMMARY

The systems, methods and devices of this disclosure each have several innovative aspects, no single one of which is solely responsible for the desirable attributes disclosed herein. A variety of example systems and methods are provided below.

Embodiment 1

A wearable head mounted display system configured to be used by a wearer having an eye, said wearable head mounted display system comprising:

an optical projector configured to output light to form an image;

a plurality of waveguides for receiving said light to direct said light into the eye of a wearer;

a frame configured to dispose the waveguides in front of said eye; and a switching device comprising a plurality of microelectromechanical systems (MEMS) mirrors disposed so as to selectively couple light into different waveguides in said plurality of waveguides.

Embodiment 2

The head mounted display system of Embodiment 1, wherein the optical projector selectively outputs different color light.

Embodiment 3

The head mounted display system of any of the Embodiments 1-2, further comprising a plurality of incoupling optical elements disposed with respect to said MEMS mirrors to receive light from said projector reflected off said MEMS mirrors and to couple said light received by said incoupling optical element into one of said waveguides associated with said incoupling optical element such that said light propagates along said waveguide by total internal reflection.

Embodiment 4

The head mounted display system Embodiment 3, further comprising a plurality of outcoupling optical elements associated with the plurality of waveguides, the plurality of outcoupling optical elements being configured to redirect light from the plurality of waveguides out of the said plurality of waveguides.

Embodiment 5

The head mounted display system of any of the Embodiments 1-4, wherein a number of the plurality of MEMS mirrors is equal to a number of the plurality of waveguides.

Embodiment 6

The head mounted display system of any of the Embodiments 1-5, wherein a number of the plurality of MEMS mirrors is less than a number of the plurality of waveguides.

Embodiment 7

The head mounted display system of any of the Embodiments 1-6, wherein the plurality of MEMS mirrors are configured to flip out of a plane of a surface parallel to a surface of the plurality of waveguides by an angle θ having a value between about 30 degrees and about 60 degrees.

Embodiment 8

The head mounted display system of any of the Embodiments 1-6, wherein the plurality of MEMS mirrors are configured to slide in and out of a light path of the output light.

Embodiment 9

A display device comprising:
a waveguide;

an incoupling optical element configured to redirect a light beam at a first wavelength from an optical source into the waveguide;
a microelectromechanical systems (MEMS) mirror; and
a controller configured to actuate the MEMS mirror such that the MEMS mirror is disposed in an optical path of the light beam and redirect the light beam towards the incoupling optical element.

Embodiment 10

The display device of Embodiment 9, further comprising:
a second waveguide;
a second incoupling optical element to redirect a second light beam at a second wavelength from the optical source into the second waveguide; and
a second microelectromechanical systems (MEMS) mirror,
wherein the controller is configured to actuate the second MEMS mirror such that the second MEMS mirror is disposed in an optical path of the second light beam and redirect the second light beam towards the second incoupling optical element.

Embodiment 11

The display device of any of the Embodiments 9-10, further comprising:
a third waveguide;
a third incoupling optical element to redirect a third light beam at a third wavelength from the optical source into the third waveguide; and
a third microelectromechanical systems (MEMS) mirror,
wherein the controller is configured to actuate the third MEMS mirror such that the third MEMS mirror is disposed in an optical path of the third light beam and redirect the third light beam towards the third incoupling optical element.

Embodiment 12

The display device of any of the Embodiments 9-11, wherein the first waveguide, the second waveguide and the third waveguide are associated with a first depth plane, and wherein light from the first, second and third waveguides are configured to produce an image appearing to originate from the first depth plane.

Embodiment 13

The display device of any of the Embodiments 9-12, further comprising:
a fourth waveguide associated with a second depth plane different from the first depth plane;
a fourth incoupling optical element associated with the fourth waveguide and configured to redirect light from the optical source at one of the first, second or third wavelengths into the fourth waveguide; and
a fourth microelectromechanical systems (MEMS) mirror disposed over the fourth incoupling optical element,
wherein the controller is configured to actuate the fourth MEMS mirror such that the fourth MEMS mirror is disposed in an optical path of the light from the optical source towards the fourth incoupling optical element.

Embodiment 14

The display device of any of the Embodiments 9-13, wherein the first waveguide, the second waveguide and the third waveguide comprise outcoupling optical elements configured to output light from the first waveguide, the second waveguide and the third waveguide.

Embodiment 15

A display device comprising:
a first plurality of waveguides associated with a first depth plane, the plurality of waveguides configured to produce an image appearing to originate from the first depth plane;
a first plurality of incoupling optical elements associated with the first plurality of waveguides, the plurality of incoupling optical elements configured to redirect light from an optical source into the plurality of waveguides;
a microelectromechanical systems (MEMS) mirror; and
a controller configured to actuate the MEMS mirror such that the MEMS mirror is disposed in an optical path of the light from the optical source and redirect said light towards the first plurality of incoupling optical elements.

Embodiment 16

The display device of Embodiment 15, further comprising:
a second plurality of waveguides associated with a second depth plane, the second plurality of waveguides configured to produce an image appearing to originate from the second depth plane;
a second plurality of incoupling optical elements associated with the second plurality of waveguides, the second plurality of incoupling optical elements configured to redirect light from the optical source into the second plurality of waveguides; and
a second microelectromechanical systems (MEMS) mirror,
wherein the controller is configured to actuate the second MEMS mirror such that the second MEMS mirror is disposed in an optical path of the light from the optical source and redirect said light towards the second plurality of incoupling optical elements.

Embodiment 17

A wearable head mounted display system configured to be used by a wearer having an eye, said wearable head mounted display system comprising:
an optical projector configured to output light to form an image;
a plurality of waveguides for receiving said light to direct said light into the eye of a wearer;
a frame configured to dispose the waveguides in front of said eye; and
a switching device comprising a plurality of switchable reflective elements disposed so as to selectively couple light into different waveguides in said plurality of waveguides, the plurality of switchable reflective elements being configured to switch between a first state in which output light is not reflected and a second state in which output light is reflected towards the plurality of waveguides.

Embodiment 18

The head mounted display system of Embodiment 17, wherein the optical projector selectively outputs different color light.

Embodiment 19

The head mounted display system of any of the Embodiments 17-18, further comprising a plurality of incoupling optical elements disposed with respect to said plurality of switchable reflective elements to receive light from said projector reflected off said plurality of switchable reflective elements and to couple said light received by said incoupling optical element into one of said waveguides associated with said incoupling optical element such that said light propagates along said waveguide by total internal reflection.

Embodiment 20

The head mounted display system Embodiment 19, further comprising a plurality of outcoupling optical elements associated with the plurality of waveguides, the plurality of outcoupling optical elements being configured to redirect light from the plurality of waveguides out of the said plurality of waveguides.

Embodiment 21

The head mounted display system of any of the Embodiments 17-20, wherein a number of the plurality of switchable reflective elements is equal to a number of the plurality of waveguides.

Embodiment 22

The head mounted display system of any of the Embodiments 17-21, wherein a number of the plurality of switchable reflective elements is less than a number of the plurality of waveguides.

Embodiment 23

The head mounted display system of any of the Embodiments 17-22, wherein the plurality of switchable reflective elements are configured to flip out of a plane of a surface parallel to a surface of the plurality of waveguides by an angle θ having a value between about 30 degrees and about 60 degrees.

Embodiment 24

The head mounted display system of any of the Embodiments 17-22, wherein the plurality of switchable reflective elements are configured to slide in and out of a light path of the output light.

BRIEF DESCRIPTION OF THE DRAWINGS

FIG. 9D-1 and FIG. 9D-2 schematically illustrate an implementation of a switching device comprising reflective mirrors that are configured to slide in and out of an optical path of a light beam.

The drawings are provided to illustrate example embodiments and are not intended to limit the scope of the disclosure.

DETAILED DESCRIPTION

Example Display Systems

VR and AR experiences can be provided by display systems having displays in which images corresponding to a plurality of depth planes are provided to a viewer. The images may be different for each depth plane (e.g. provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed herein, such depth cues provide credible perceptions of depth.

An important aspect of presenting a realistic augmented reality experience is to provide the display of colored images. In some configurations, a full color image may be formed for the various depth planes by overlaying component images that each have a particular component color. For example, red, green, and blue images may each be outputted to form each full color image. As a result, each depth plane may have multiple component color images associated with it. As disclosed herein, the component color images may be outputted using waveguides that incouple light containing image information, distribute the incoupled light across the waveguides, and then outcouple light towards a viewer.

In some wearable display systems, this may be achieved through the use of red/green/blue (RGB) light emitting diodes (LEDs), which are combined into a single output. As an example, for visible wavelengths, one type is an RGB combiner. These wavelengths can be used to generate entire color palates for display technologies. However, because each of the RGB LEDs is associated with its own particular wavelength, combining the three (or more) discrete LEDs into one can pose many challenges. In addition, both the size and the weight of the combiner and any associated optics are considerations, especially in context of head-worn augmented reality display systems. Size can affect whether the device maintains remains aesthetically appealing to consumers. Similarly, weight is also an important concern given that the head worn AR display is configured to be worn directly on the user's head, thereby directly affecting comfort and appeal for the user of the head-worn AR device.

Various systems and methods described herein, utilizing MEMS mirrors for depth plane switching, may reduce the size of a projector (e.g., comprising RGB LEDs) that provides different color illumination and that is used with displays that provide multiple depth planes for viewing. Advantageously, such systems and methods may reduce weight, reduce size, or improve ergonomics of wearable display systems.

Figure 2:
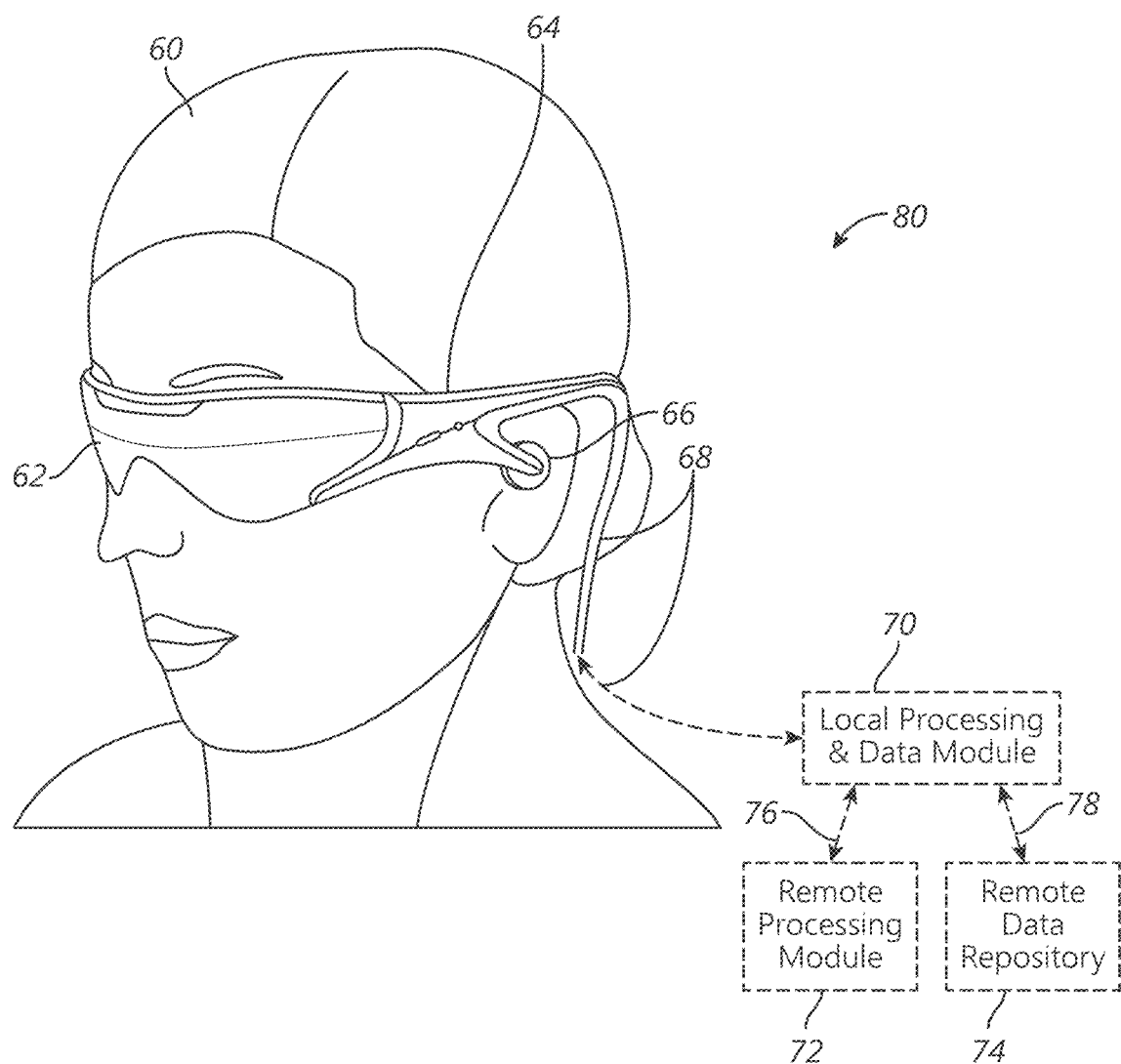
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.) and/or may allow audio communication with other persons (e.g., with other users of similar display systems).

With continued reference to FIG. 2, the display 62 is operatively coupled 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the location processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be stand alone structures that communicates with the location processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
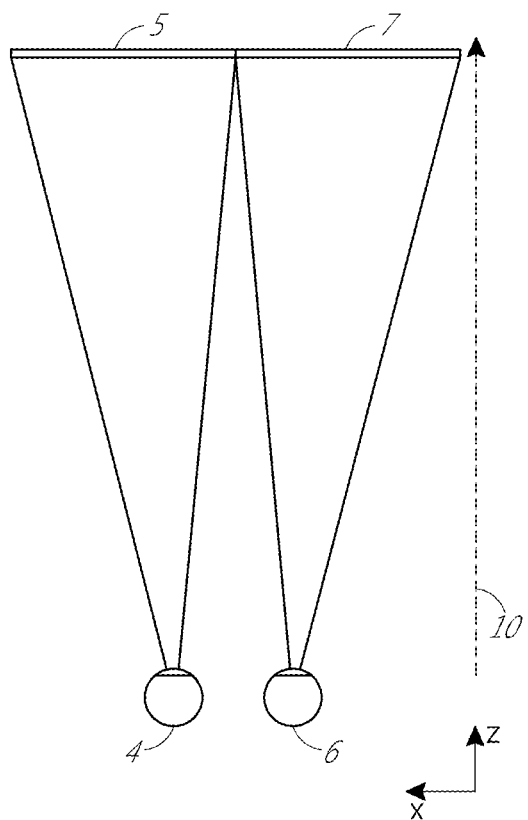
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
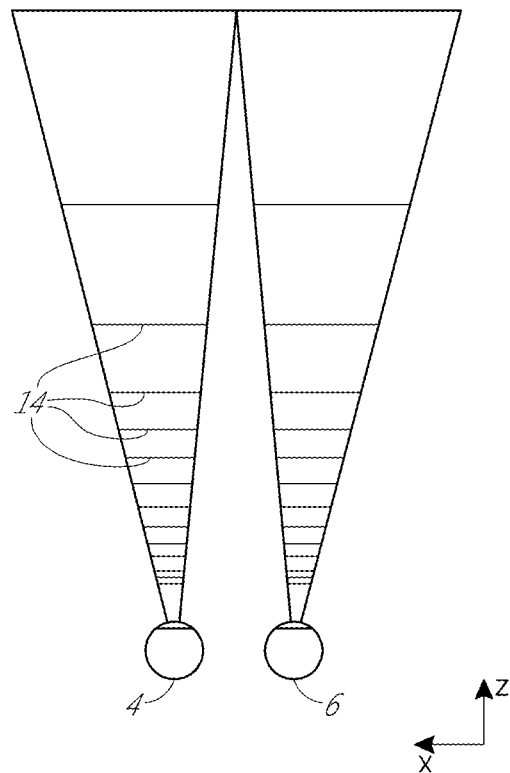
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. It will addition, while shown as flat for ease of illustration, it will be appreciated that the contours of a depth plane may be curved in physical space, such that all features in a depth plane are in focus with the eye in a particular accommodated state.

Figure 5A:
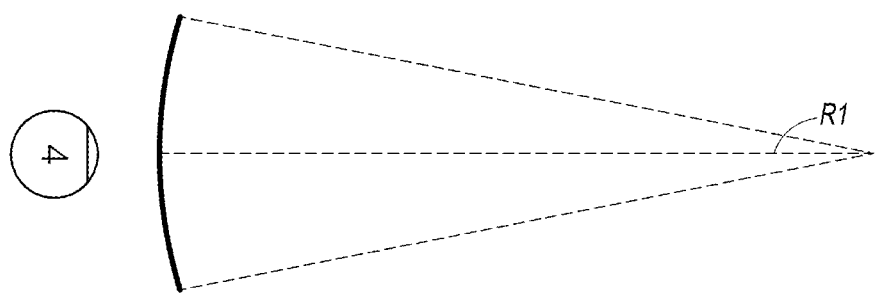
FIGS. 5A-5C illustrate relationships between radius of curvature and focal radius.
Figure 5B:
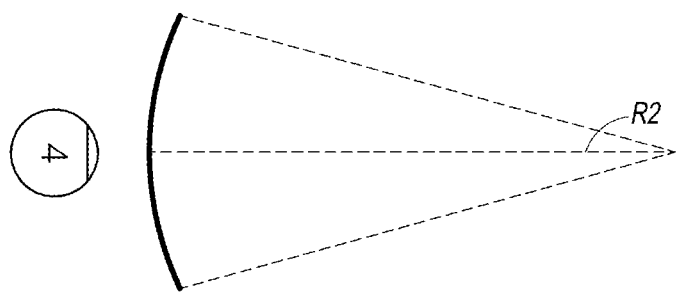
Figure 5C:
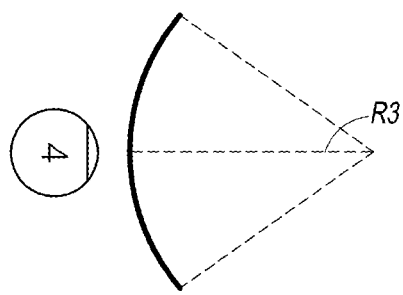

The distance between an object and the eye 4 or 6 can also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
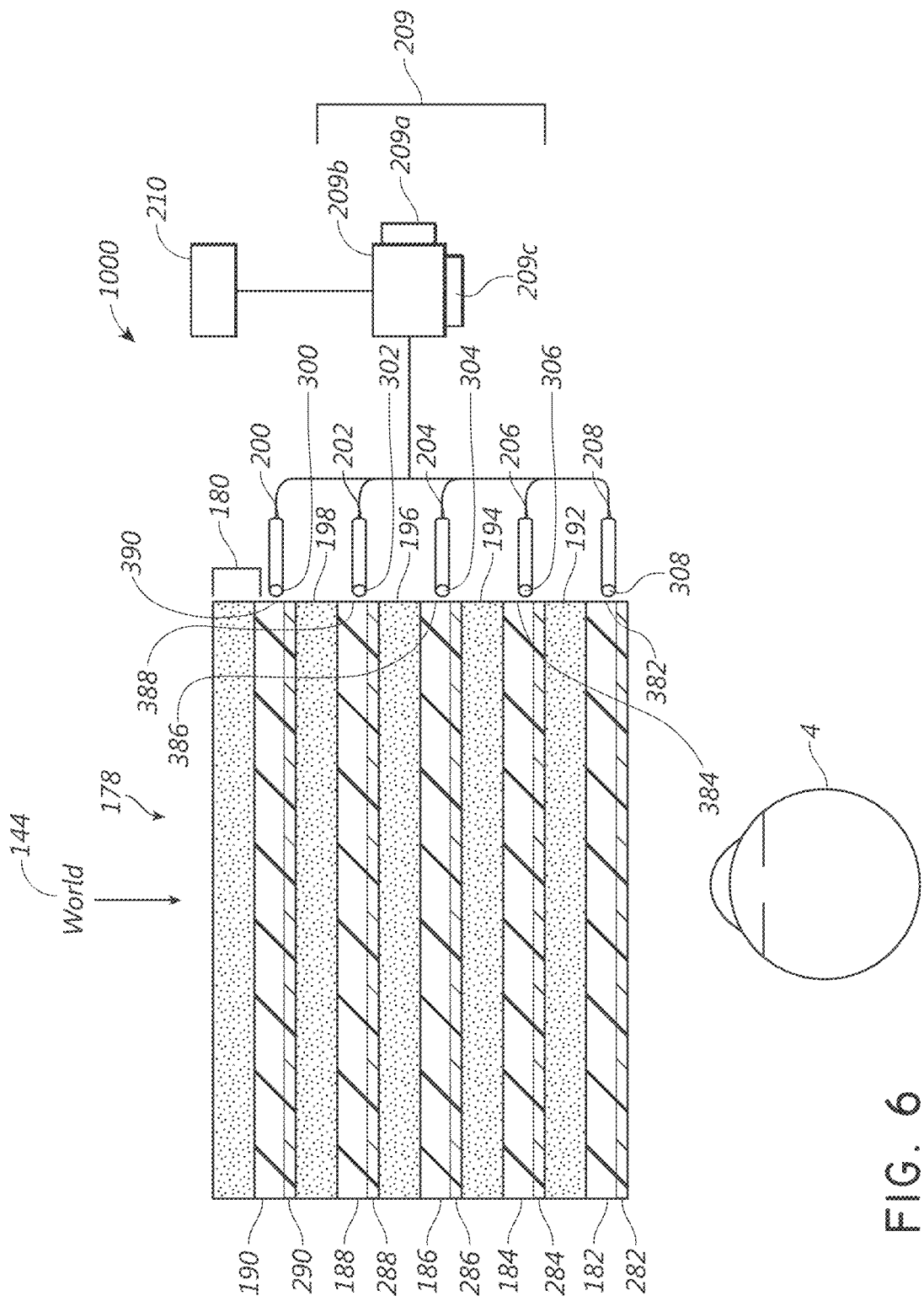
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2.

Figure 8:
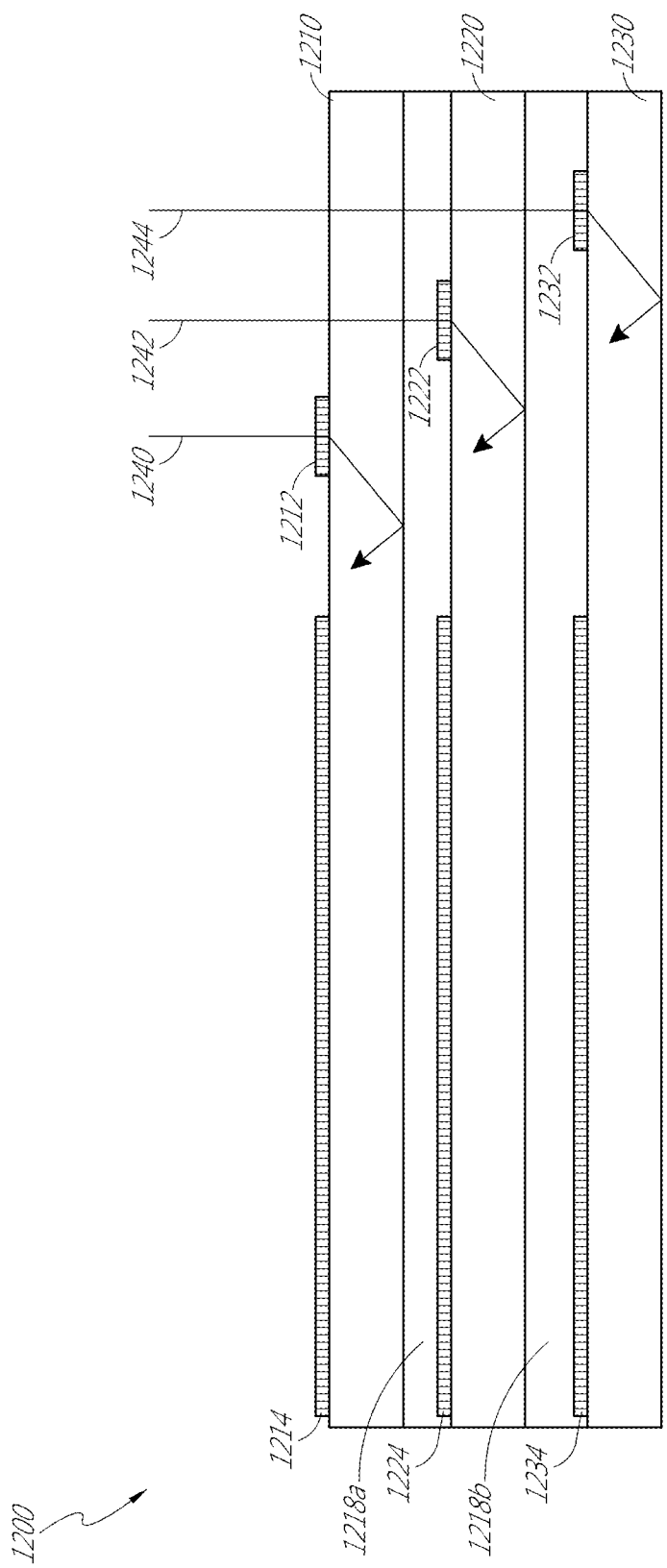
FIG. 8 illustrates a cross-sectional side view of an example of a set of stacked waveguides that each includes an incoupling optical element.

With continued reference to FIG. 6, the waveguide assembly 178 may also include a plurality of features 198, 196, 194, 192 between the waveguides. In some embodiments, the features 198, 196, 194, 192 may be lens. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the each of the input surfaces 382, 384, 386, 388, 390 may be an edge of a corresponding waveguide, or may be part of a major surface of the corresponding waveguide (that is, one of the waveguide surfaces directly facing the world 144 or the viewer's eye 4). Such a configuration wherein in light is injected into a major side (not an edge) of the waveguide is shown in FIG. 8. In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the light injected into the waveguides 182, 184, 186, 188, 190 is provided by a projector assembly 209 which comprises a light output module 209c, which may include a light source, such as a light emitting diode (LED) or a fluorescent bulb. The light from the light output module 209c may be directed to and modified by a light modulator 209a, e.g., a spatial light modulator, via beam splitter or beam combiner (e.g., a polarizing beam splitter or a RGB beam splitter/beam combiner) 209b. The light modulator 209a may be configured to change the perceived intensity of the light injected into the waveguides 182, 184, 186, 188, 190. Examples of spatial light modulators include liquid crystal displays (LCD) including a liquid crystal on silicon (LCOS) displays.

A controller 210 controls the operation of one or more of the stacked waveguide assembly 178, including operation of the image injection devices 200, 202, 204, 206, 208, the light source 209c, and the light modulator 209a. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes such as disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 282, 284, 286, 288, 290 may, for example, be gratings, including diffractive optical features, as discussed further herein. While illustrated disposed at the bottom major surfaces of the waveguides 182, 184, 186, 188, 190 for ease of description and drawing clarity, in some embodiments, the outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images from the same depth plane, or multiple subsets of the waveguides 182, 184, 186, 188, 190 may be configured to output images from the same plurality of depth planes, with one set for each depth plane. This can provide advantages for forming a tiled image to provide an expanded field of view at those depth planes.

With continued reference to FIG. 6, the outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 282, 284, 286, 288, 290, which output light with a different amount of divergence depending on the associated depth plane. In some embodiments, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. In some embodiments, the features 198, 196, 194, 192 may not be lenses; rather, they may simply be spacers (e.g., cladding layers and/or structures for forming air gaps).

In some embodiments, the outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
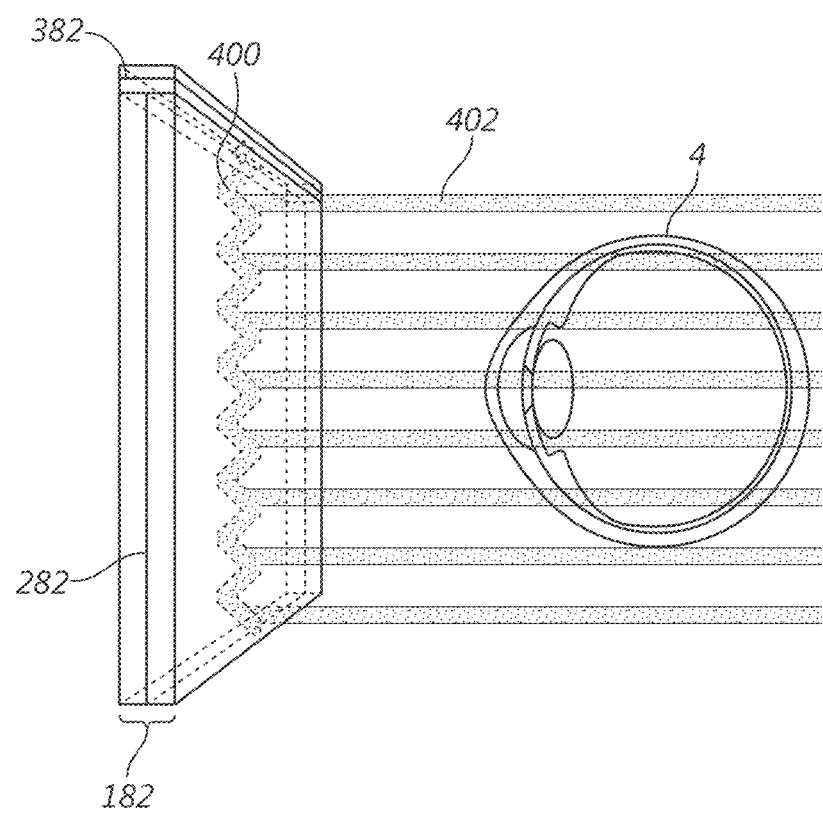
FIG. 7 illustrates an example of exit beams outputted by a waveguide.

FIG. 7 shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

In some embodiments, light of component colors may be outputted by a single dedicated waveguide and, consequently, each depth plane may have multiple waveguides associated with it. Light can be separated into constituent colors (e.g., red (R), green (G), and blue (B)), and it may be desirable to send different constituent colors to different layers of the waveguide display assembly. For example, for each particular depth plane to be provided, the waveguide assembly may include multiple waveguide layers to display different colors of light (e.g., R, G, and B layers). As an example, a waveguide assembly having three depth planes, with each depth plane comprising three colors (e.g., R, G, and B), may include nine waveguide layers. As described herein, the waveguide assembly can be configured to send light of the appropriate color to a particular layer for the particular depth plane (e.g., red light for a red color layer in a particular depth plane). For example, each depth plane may have a first waveguide layer associated with a first color G, a second waveguide layer associated with a second color, R; and a third waveguide layer associated with a third color, B. Accordingly, in this example, three waveguides may be provided per depth plane where three component color images are provided per depth plane. It will be appreciated that, in a physical device, the waveguides may all be arranged in a stack with one waveguide per level. These waveguides for a particular depth plane may or may not be adjacent to each other. In some other embodiments, multiple component colors may be outputted by the same waveguide, such that, e.g., only a single waveguide may be provided per depth plane.

Although described generally above as three component colors, in one embodiment, G is the color green, R is the color red, and B is the color blue. In some other embodiments, other colors, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm. Other wavelengths are also possible.

With reference now to FIG. 8, in some embodiments, light impinging, for example on a major face, of a waveguide may be redirected to incouple that light into the waveguide. An incoupling optical element may be used to redirect and incouple the light into its corresponding waveguide. FIG. 8 illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that involves light being redirected for incoupling.

The illustrated set 1200 of stacked waveguides includes waveguides 1210, 1220, and 1230. Each waveguide includes an associated incoupling optical element, with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. For example, certain wavelengths of the light can be deflected (e.g., reflected, refracted, or diffracted) at a first layer comprising the incoupling optical element 1212 into a first waveguide of the waveguide stack while other wavelengths can be transmitted to other incoupling optical elements 1222, 1232 to be directed to other waveguides in the stack. For example, the first incoupling optical element 1212 may be configured to deflect red light into the first waveguide (configured for red light) while transmitting other wavelengths (e.g., green and blue) to other layers of the waveguide stack. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 1213, 1223, 1233 and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively. The light distributed elements 1214, 1224, 1234 may distribute light in both x and y coordinates. For example, a first light distributing element (which may be referred to as an orthogonal pupil expander) may distribute light in one direction and a second light distributing element (which may be referred to as an exit pupil expander) may distribute light in a second direction perpendicular to the first direction. The second light distributing element may also cause the light to exit the waveguide so as to be directed in to the wearer's eye.

The waveguides 1210, 1220, 1230 may be spaced apart and separated by gas and/or solid layers of material. For example, as illustrated, layer 1218a may separate waveguides 1210 and 1220; and layer 1218b may separate waveguides 1220 and 1230. In some embodiments, the layers 1218a and 1218b are formed of low refractive index materials (that is, materials having a lower refractive index than the material forming the immediately adjacent one of waveguides 1210, 1220, 1230). Preferably, the refractive index of the material forming the layers 1218a, 1218b is 0.05 or more, or 0.10 or more less than the refractive index of the material forming the waveguides 1210, 1220, 1230. Advantageously, the lower refractive index layers 1218a, 1218b may function as cladding layers that facilitate total internal reflection (TIR) of light through the waveguides 1210, 1220, 1230 (e.g., TIR between the top and bottom major surfaces of each waveguide). In some embodiments, the layers 1218a, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218a, 1218b are similar or the same. In some embodiments, the material forming the waveguides 1210, 1220, 1230 may be different between one or more waveguides, and/or the material forming the layers 1218a, 1218b may be different, while still holding to the various refractive index relationships noted above.

With continued reference to FIG. 8, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR.

For example, incoupling optical element 1212 may be configured to deflect ray 1240, which has a first wavelength or range of wavelengths. Similarly, the transmitted ray 1242 impinges on and is deflected by the incoupling optical element 1222, which is configured to deflect light of a second wavelength or range of wavelengths. Likewise, the ray 1244 is deflected by the incoupling optical element 1232, which is configured to selectively deflect light of third wavelength or range of wavelengths.

With continued reference to FIG. 8, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234. As discussed above, turning features such as for example diffractive features (e.g., in one or more holographic optical element) are used to spread the light out and eject the light from the waveguide to the wearer's eye for viewing the image formed by the display.

Figure 9A:
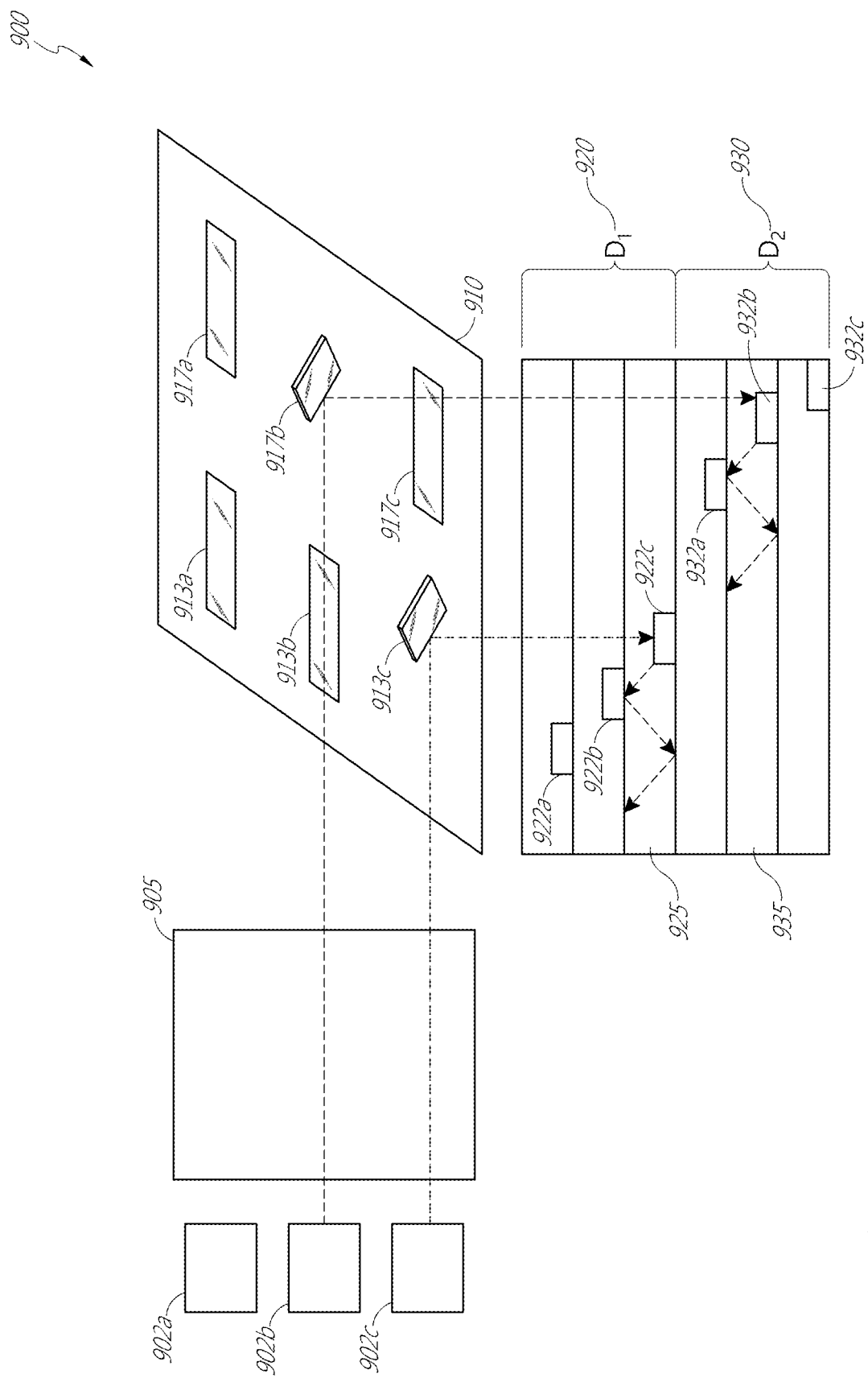
FIG. 9A is a schematic illustration that includes a cross-sectional side view of an example of a set of stacked waveguides optically coupled to a depth switching device comprising MEMS mirrors.

FIG. 9A illustrates a cross-sectional side view of an example of a set of stacked waveguides optically coupled to a depth switching device with MEMS mirrors. The system 900 illustrated in FIG. 9A shows LEDs 902 emitting light into projector optics 905. Each LED 902 may comprise a different color LED. For example, LED 902a can be a red (R) color LED; LED 902b be can be a green (G) color LED; and LED 902c can be a blue (B) color LED. The projector optics 905 projects light into a switching device 910 comprising MEMS mirrors 913 and 917. In one embodiment, the switching device 910 can be a MEMS layer disposed on a set of waveguides. The MEMS mirrors may redirect light to respective waveguides for particular depth planes 920, 930. As illustrated, the first column of MEMS mirrors 913a, 913b, 913c redirect light to respective incoupling optical elements 922a-c; and the second column of MEMS mirrors 917a, 917b, 917c redirect light to respective incoupling optical elements 932a-c. The incoupling optical elements 922a-c may each be disposed on a corresponding waveguide layer associated with a first depth plane $D_1$ 920; and the incoupling optical elements 932a-c may each be disposed on a corresponding waveguide layer associated with a second depth plane $D_2$ 930. The incoupling optical elements 922a-c and 932a-c may be disposed to receive light reflected from the corresponding mirror 913a-c and 917a-c. In some embodiments, these waveguides that turn light out to the wearer's eye may be referred to as eyepieces.

As illustrated, light from the LEDs 902 may be redirected by the switching device 910 to respective waveguide associated with a particular depth plane. Additionally, each type of light (e.g., R, G, or B color) emitted from LEDs 902 may have a specific corresponding waveguide layer and corresponding incoupling optical element based on the location of the light beam output by the LED and the location of the incoupling optical element on the waveguide. The MEMS switching device 910 redirects light to that specific corresponding waveguide layer with the corresponding incoupling optical element. For example, B color light emitted from LED 902c and projected from the projector optics 905 can be redirected by the MEMS mirror 913c to the corresponding B color waveguide guide associated with the first depth plane $D_1$, shown in FIG. 9A as the waveguide 925. Continuing in the illustrated example, G color light emitted from LED 902b and projected from the projector optics 905 can be redirected by the MEMS mirror 917b to the G color waveguide associated with the second depth plane $D_2$, shown in FIG. 9A as the waveguide 935. The incoupling optical elements 922c and 932b may redirect light within that specific waveguide layer. Continuing in the same example, B color light is turned and propagated through waveguide 925 by the incoupling optical element 922c; G color light is turned and propagated through waveguide 935 by the incoupling optical element 932b.

Figure 9B:
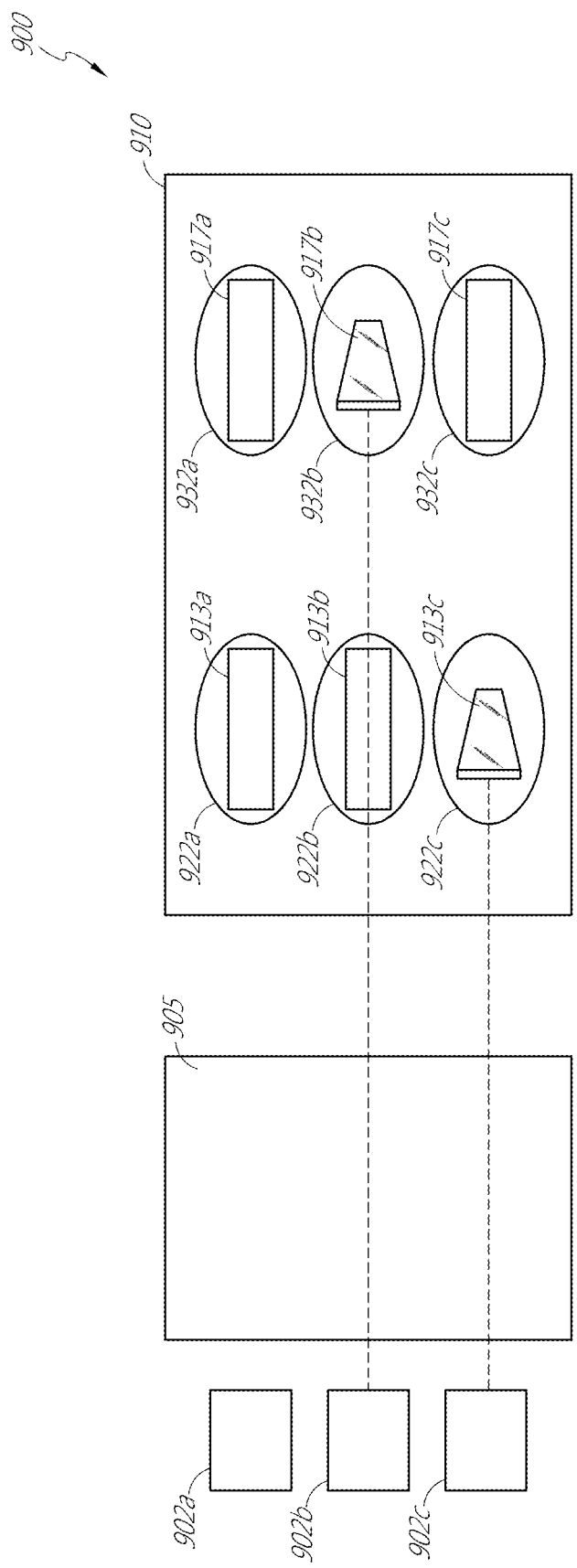
FIG. 9B schematically illustrates a top view of an example of a depth switching device with MEMS mirrors optically coupled to a projector light source.
Figure 9C:
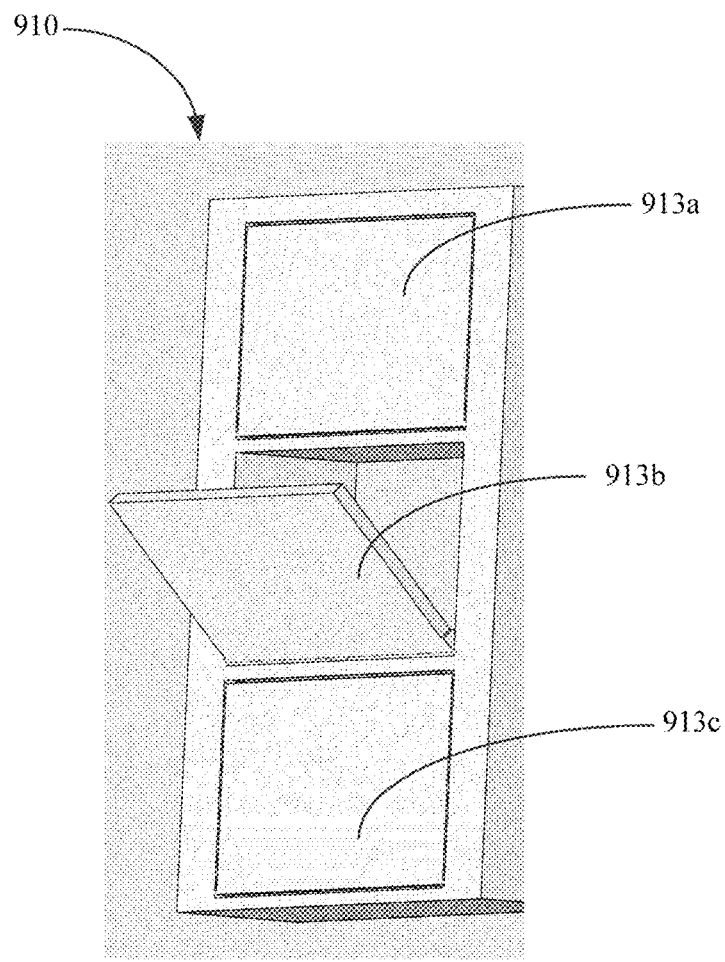
FIG. 9C schematically illustrates an implementation of a switching device comprising reflective mirrors that are configured to flip in and out of a plane parallel to the surface of the switching device.

The LEDs 902 and the MEMS mirrors 913, 917 may be controlled by a controller (e.g., the controller 210) comprising one or more processing modules. For example, the LEDs 902 and the MEMS mirrors 913, 917 may be utilized to display an image into an eye based on sequencing component colors of light to be redirected into respective portions of the waveguide assembly and thus to different depth planes 920 and 930 via the corresponding set of waveguides. The controller (e.g., controller 210) may be configured to utilize the one or more processing modules (e.g., processing modules 70, 72) to determine a sequence of emitting light from the LEDs 902 and adjusting the MEMS mirrors 913, 917 two redirect light to the depth planes 920 and 930 via the respective waveguides in the waveguide assembly. As depicted in FIG. 9B and FIG. 9C, the MEMS mirrors 913, 917 may be actuated to tilt out of the plane of the switching device 910 at an angle θ (e.g. an angle greater than or equal to about 30 degrees, an angle greater than or equal to about 45 degrees, an angle greater than or equal to about 60 degrees, etc.) with respect to a normal to the surface of the plane of the switching device. The plane of the switching device may be parallel to the plane of a surface of the waveguide 925, 935. The MEMS mirrors 913, 917 when actuated to tilt in the manner described can redirect light to a particular waveguide at an angle β with respect to the normal to the surface of the particular waveguide. In various embodiments, the MEMS mirrors 913 and 917 can be configured to flip out of the plane of the switching device (or a plane parallel to the surface of the waveguide) at an angle of about 45 degrees to redirect light to a particular waveguide along a direction substantially normal to the surface of that particular waveguide. The controller (e.g., controller 210) can be configured to control an actuator or drive mechanisms that are configured to tilt the MEMS mirrors 913, 917. FIG. 9C schematically illustrates an implementation of a switching device comprising reflective mirrors that are configured to flip in and out of a plane parallel to the surface of the switching device. In the illustrated implementation, mirror 913b is actuated to flip out of the plane of the switching device 910 such that incident light is reflected towards the waveguides 925, 935. The mirrors 913a and 913c are not actuated allowing light beams originating from the corresponding pupils of the projector 905 to pass without being reflected towards the waveguides.

Although the system 900 has been described above with two depth planes, any number of depth planes (e.g., 3 or more) can be configured to be used with a MEMS switching device 910. Additionally or alternatively, while the system 900 has been described above with three component colors, other component colors may be utilized. In an embodiment where additional colors are to be provided, additional MEMS mirrors may be included on the device 910 to redirect light from those colors to respective waveguides and corresponding incoupling optical elements.

FIG. 9B schematically illustrates a top view of an example of a depth switching device with MEMS mirrors. FIG. 9B shows the top view of MEMS mirrors. For the sake of brevity, the system 900 includes the same components as the system 100 illustrated in FIG. 9A. FIG. 9B illustrates that the MEMS mirrors 913 and 917 may be configured on the device 910 in such a way that each MEMS mirror 913, 917 directly overlays its corresponding incoupling optical element 932.

As described herein, the projector 905 may be used to project light for generating content on a wearable display. This projector 905 utilizes LEDs 902, a spatial light modulator (e.g., light modulator 209a), and optics to launch a light beam containing the image information into an eyepiece (e.g., a set of waveguides). In various embodiments, the projector 905 may have a single pupil or multiple pupils. For example, in a system having three depth planes for each of the three wavelengths (R, G and B), the projector 905 can be configured to have nine (9) projected pupils—one pupil for each combination of wavelength and depth plane. Reducing the number of projected pupils can reduce the size of the projector 905. MEMS mirrors as discussed above can be used reduce the number of projected pupils. For example, in a system having three depth planes for each of the three wavelengths (R, G and B), the projector 905 can be configured to have three (3) projected pupils—one for each wavelength R, G, and B. The light from the three (3) projected pupils can be incoupled into a particular waveguide associated with a particular wavelength and a particular depth plane by actuating a reflective mirror associated with the particular waveguide. In this manner the number of projected pupils of the projector can be reduced from nine (9) to three (3). As another illustrative example, in the system 900 having two depth planes as illustrated in FIG. 9A, the number of projected pupils can be reduced from six (6) to three (3) by the use of the MEMS mirrors 913 and 917 that allows the projected pupil of each wavelength of light to be redirected to a particular depth plane. Without any loss of generality, one projector can be used to project information content into each eye when the wearable display comprises an eyewear.

Figure 10A:
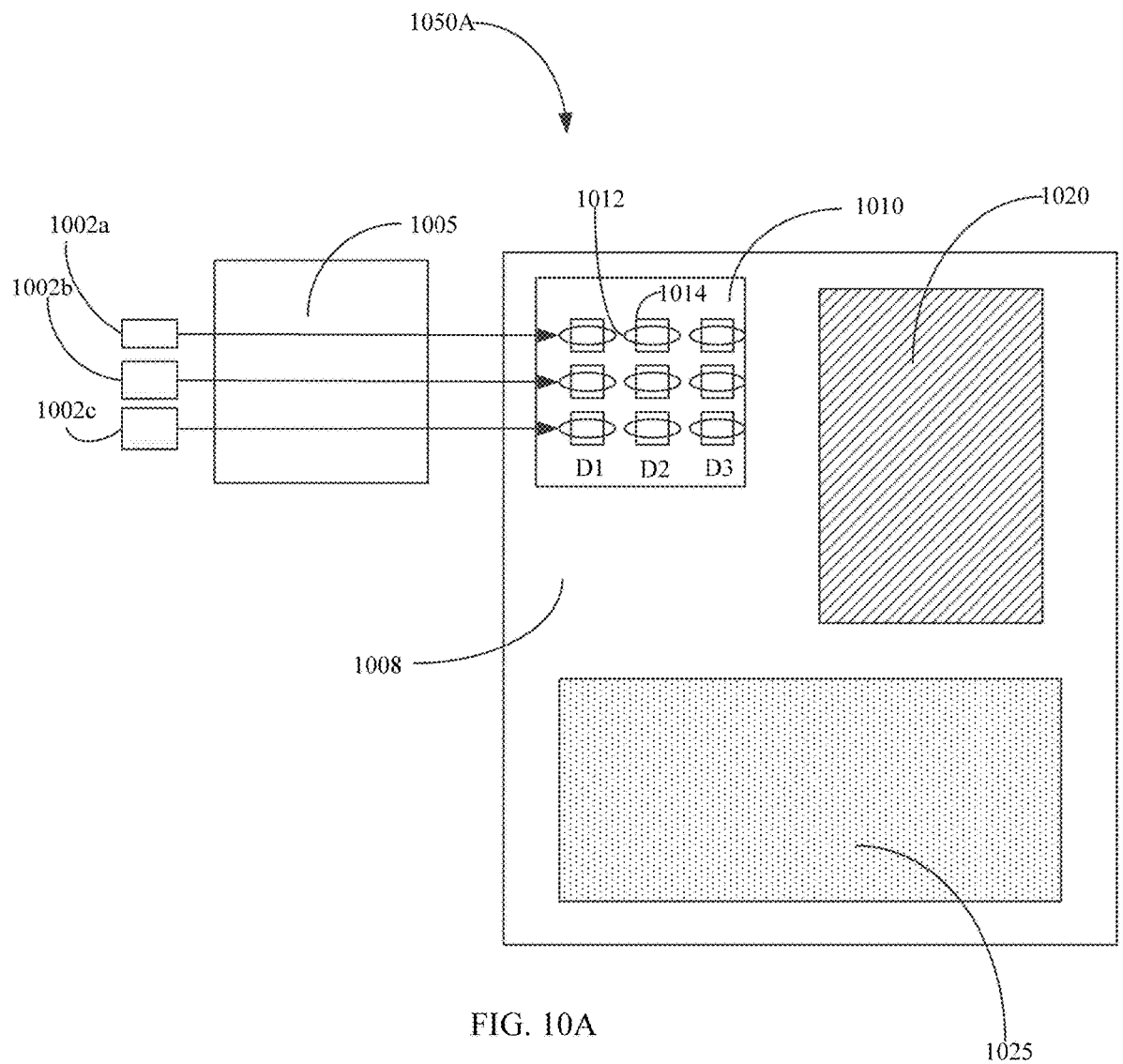
FIGS. 10A and 10B illustrate top plan views of a various embodiments of a display device comprising MEMS mirrors.
Figure 10B:
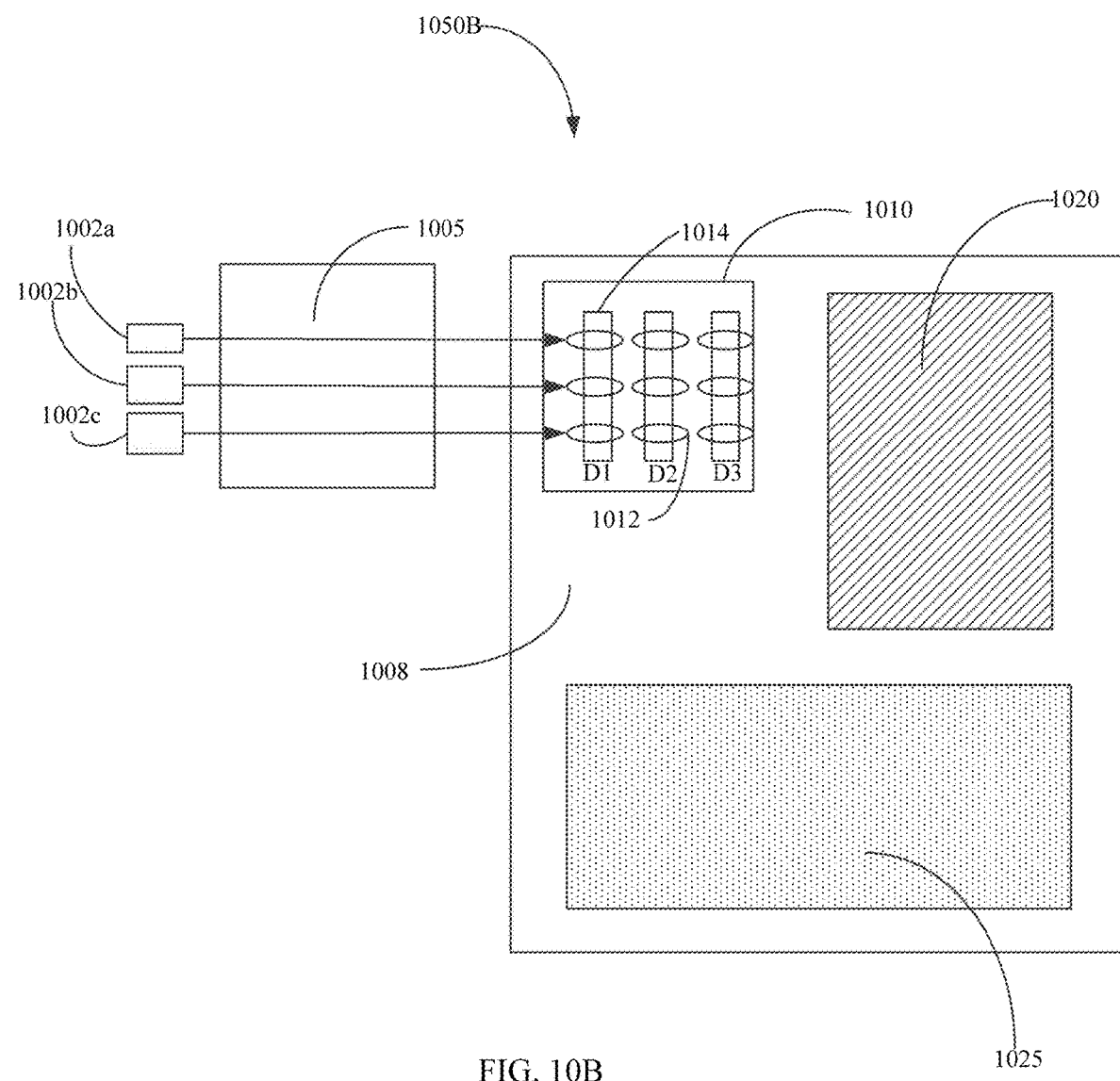

As discussed above, projector systems that utilize multiple pupils may be larger and heavier, than the systems described herein (e.g., system 900 illustrated in FIGS. 9A and 9B and system 1050A illustrated in FIG. 10A and system 1050B illustrated in FIG. 10B). For example as discussed above, a projector system for a three depth plane, three color system may have nine pupils that are provided by the projector (e.g., individual lasers or LEDs). Such a configuration may result in a projector with a significantly larger diameter as compared to a single pupil or single color or single depth system. This size may be undesirable, as it adds weight and volume, and may restrict component placement within a wearable architecture.

The systems and methods described herein allow a full color, multi-depth wearable display. As described with respect to FIGS. 9A-9B, the system utilizes MEMS mirror technology to selectively route the projected pupils for different wavelengths to individual depth planes. In some embodiments, a single MEMS mirror can be used to route light to one of two potential outputs. For example, when the mirror is in an "off" state, the mirror lays flat as shown in FIG. 9C. Accordingly, the light simply passes over that mirror and continues in a straight line. When the mirror is in an "on" state, the mirror flips up/down out of a plane of the switching device which is parallel to the plane of the waveguide by an angle θ (e.g., an angle of about 45 degrees) with respect to a normal to the surface of the waveguide as shown in FIG. 9C. Accordingly, the light hits this mirror and reflects, with the beam now turned by an angle β (e.g., about 90 degrees) with respect to the normal to the surface of the waveguide.

In one embodiment of a single pupil system, the individual mirrors are arranged in a 1×N array. Accordingly, one input beam can now be switched to a multitude of output channels by activating or actuating the mirror for a respective waveguide corresponding to the desired channel. As another example, a three depth plane system may utilize a 1×3 array of mirrors as depicted in FIG. 10B. If the first mirror is in "on" state, the image is routed to depth $D_1$. If first mirror is "off" (e.g., down) and the second mirror is "on" (e.g., up), the image is routed to depth plane $D_2$. Such an embodiment may be utilized as a depth switch for a single pupil system.

As another embodiment, a depth switch may be configured for a multi-pupil system. Such a depth switch may reduce or minimize the number of pupils that are transmitted through the projector 905. Depth switching can thus be achieved with a smaller and lighter projector. For example, as described above, a full color, 3 depth plane split pupil projector system may require 9 individual pupils to be transmitted through the projector. In contrast, in such a system having MEMS mirrors or switches to switch between depth planes, the number of pupils provided by the projector can be reduced to three (1 red, 1 green, and 1 blue) and still achieve the same full color, three depth plane performance. For example, as described above with respect to the device 910 in FIG. 9A, two 1×3 MEMS mirror arrays, or 6 total mirrors are utilized to redirect light to respective waveguides for the two depth planes. As illustrated, the projector 905 projects three pupils (e.g., the light from LEDs 902a, 902b, 902c). Likewise, the illumination portion of the projector may contain 3 pupils, one of each color possibly arranged in a linear pattern. Upon exiting the projector, each color may be addressed to a specific mirror of a 1×3 mirror array. Accordingly, each pupil (e.g., each color) can now be routed to any depth plane. Scalability can be achieved by adding additional mirrors to each pupil channel. Accordingly, the system 900 is n×n scalable.

The reduction in projector size and weight for a multi-pupil projector is also an improvement. By reducing the number of pupils in the system, the size of the optics can be reduced. This results in a weight reduction of the optics themselves, but also an additional weight savings associated with smaller housings and mounting components. Additionally, with pupils aligned in a linear array, one axis of the projector can be made much thinner than the other axis (e.g., as compared to a 9 pupil system with a circular pupil configuration). With the correct orientation, this reduced size of the projector 905 may allow mounting in configurations that would not be possible with a larger system. Therefore, the ergonomics of the wearable device can be significantly improved beyond simple weight savings.

Other MEMS mirrors configurations are possible. In another embodiment of system 900, the number of MEMS mirrors is reduced to two. Accordingly, rather than including two 1×3 arrays of mirrors, there is a single 1×2 array of mirrors, where the mirror extends across one axis such that all pupils hit the same mirror for a given depth plane. Such a configuration may reduce moving parts and provide more space, for example, for a drive mechanism. The drive mechanism may actuate the MEMS mirrors to tilt. For such a method the MEMS mirrors may be driven faster with faster actuation time or response time to accommodate the different colors.

In various embodiments, the light emitted from each LED may be sequenced to emit different colors at different times in color sequential operation. For example, in one embodiment, one color may be on at any given moment and the colors are turned on in a specific sequence that remains constant for all frames. The colors may be sequenced at a fast enough a rate so that the eye interprets them as being simultaneous. For example, in one embodiment with one MEMS mirror for all three R, G, and B channels for a given depth plane, the MEMS mirrors may switch at three times the desired frame rate in comparison to an embodiment with three separate MEMS mirrors for the three R, G, and B channels. In an embodiment with three separate MEMS mirrors for each of three R, G, and B channels, light emitted from each LED may be non-sequential, with light emitted from a plurality of the LEDs at simultaneous times. For example, an R color LED may emit light to be redirected by a first MEMS mirror associated with a first depth plane, while the G color LED may emit light to be redirected by a second MEMS mirror associated with a second depth plane. Such an embodiment can be referred to as a fully addressable, as each MEMS mirror for each color component and each depth plane can be independently addressed or actuated. In such a case, the MEMS mirrors may switch at the desired frame rate for a full RGB display. In another embodiment, the MEMS mirrors may switch at any other desired frame rate. In other embodiments, the MEMs mirrors may switch for a non-color sequential method.

FIGS. 10A and 10B illustrate top views of embodiments 1050A and 1050B of a display system including a plurality of MEMS mirrors. The embodiments 1050A of FIG. 10A and 1050B of FIG. 10B comprise a plurality of optical sources 1002a, 1002b, and 1002c configured to output three different wavelengths of light (e.g., red, green and blue). The different wavelengths of light are projected by a projector 1005 having three projection pupils. Different projection pupils (e.g., each projection pupil) of the projector 1005 can be associated with a respective wavelength of light emitted from the three optical sources 1002a, 1002b and 1002c. Light projected from the projector 1005 is incident on a switching device 1010 associated with a waveguide system 1008. The waveguide system 1008 can comprise a plurality of waveguides associated with a plurality of depth planes. For example, the waveguide system 1008 can include nine (9) waveguides—a first three of the nine waveguides being associated with a first depth plane (D1), a second three of the nine waveguides being associated with a second depth plane (D2), and a third three of the nine waveguides being associated with a third depth plane (D2). The waveguide associated with a particular depth plane can be configured to incouple a respective one of the three projected wavelengths of light. Different waveguides (e.g., each waveguide) in the waveguide system 1008 can be associated with an incoupling optical element 1012 that is configured to incouple a respective one of the three projected wavelengths of light. The switching device 1010 of embodiment 1050A of FIG. 10A comprises a 3×3 array of MEMS mirrors 1014. Different MEMS mirror of the 3×3 array of MEMS mirrors 1014 (e.g., each MEMS mirror) are configured to redirect a respective one of the three wavelengths of light towards a corresponding incoupling optical element 1012 associated with one of the three depth planes D1, D2 or D3. As discussed above, different MEMS mirror in the 3×3 array of the switching device 1010 in the embodiment 1000A can be fully addressable such that MEMS mirror associated with different color components and depth planes can be independently addressed or actuated.

The switching device 1010 of embodiment 1050B of FIG. 10B comprises a 1×3 array of MEMS mirrors 1014. A first mirror in the 1×3 array of mirrors of the switching device 1010 of embodiment 1050B of FIG. 10B is associated with a first depth plane D1, a second mirror in the 1×3 array of mirrors of the switching device 1010 of embodiment 1050B of FIG. 10B is associated with a second depth plane D2; and a third mirror in the 1×3 array of mirrors of the switching device 1010 of embodiment 1050B of FIG. 10B is associated with a third depth plane D3. When actuated, the first mirror in the 1×3 array of mirrors of the switching device 1010 of embodiment 1050B of FIG. 10B is configured to direct light at any of the three wavelengths output from the projector 1005 to the plurality of waveguides associated with the first depth plane, the second mirror in the 1×3 array of mirrors of the switching device 1010 of embodiment 1050B of FIG. 10B is configured to direct light at any of the three wavelengths output from the projector 1005 to the plurality of waveguides associated with the second depth plane, and the third mirror in the 1×3 array of mirrors of the switching device 1010 of embodiment 1050B of FIG. 10B is configured to direct light at any of the three wavelengths output from the projector 1005 to the plurality of waveguides associated with the third depth plane.

In some embodiments, the light emitted from different LEDs may be sequenced to emit different colors at different times in color sequential operation and turned by one of the MEMS mirrors in the 1×3 array of mirrors in the switching device 1010 shown in embodiment 1050B to redirect the particular wavelength towards one of incoupling optical elements 1012 associated with one of the three depth planes D1, D2 or D3. In some embodiments, the projector may be configured to emit light of different wavelengths at the same time which can be turned by one or more of the mirrors in the 1×3 array of mirrors in the switching device 1010 shown in embodiment 1050B of FIG. 10B to redirect the different wavelengths emitted towards respective incoupling optical elements 1012 for the partial color and associated with one of the three depth planes D1, D2 or D3.

Referring to FIGS. 10A and 10B, each waveguide in the waveguide system 1008 can further comprise optical elements 1025 that are configured to expand pupil size of the incoupled light and optical elements 1020 that are configured to redirect light out of the waveguide.

Figure 1:
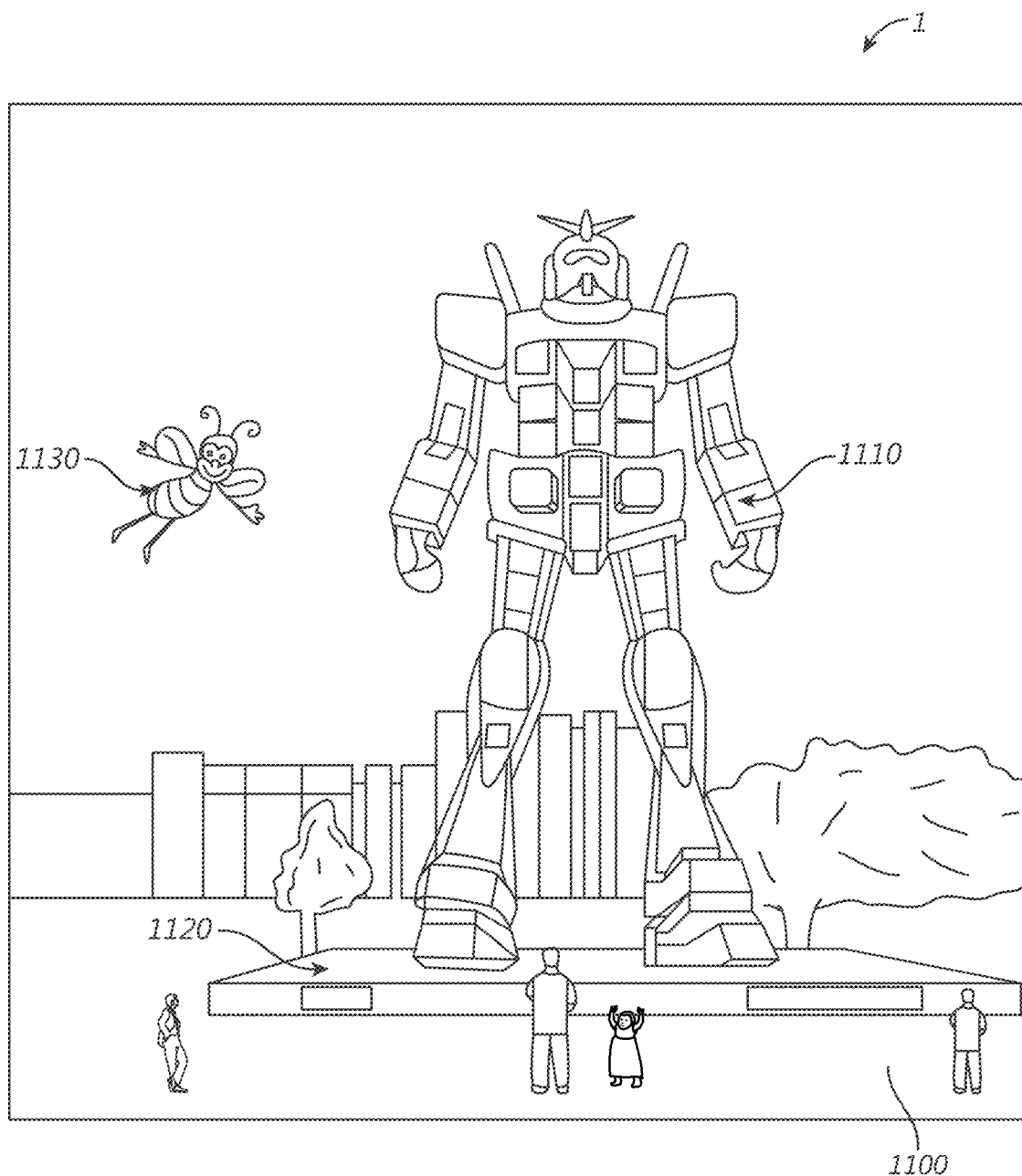
FIG. 1 illustrates a user's view of augmented reality (AR) through an AR device.
Figures 1, 9D:
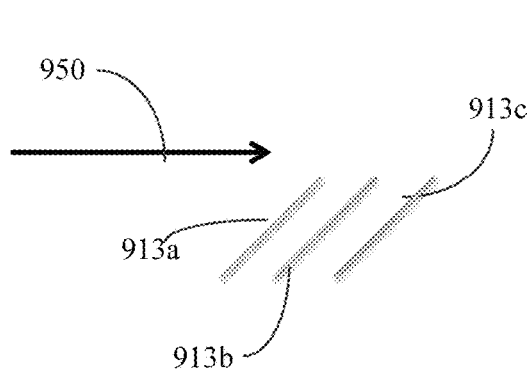
Figures 2, 9D:
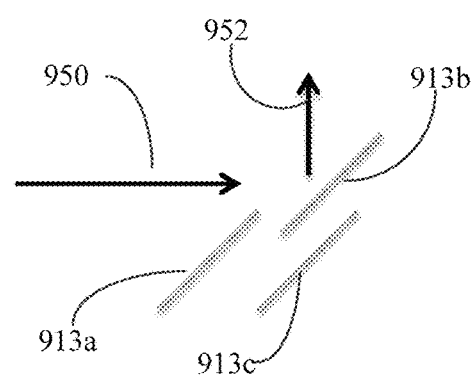

In other embodiments, the MEMS mirrors comprise sliding mirrors as shown in FIGS. 9D-1 and 9D-2. For example, in these embodiments, the MEMS mirrors may slide up into the path of the beam for switching. As depicted in FIG. 9D-1 when the mirrors are not actuated, incoming beam of light 950 passes without being reflected. When actuated one of the mirrors (e.g., mirror 913*b*) may slide up into the path of the beam 950. The beam 950 is reflected as light beam 952 by the actuated mirror (e.g., mirror 913*b*) as shown in FIG. 9D-2. The sliding mirrors can also be placed closer to one another and thus in some embodiments, the sliding mirrors have a higher packing density relative to the packing density of the tilting mirrors. This may reduce the working distance of the projector as the MEMS mirrors are less spread out. A shorter working distance of the projectors may also reduce the size and weight of the projector. Other configurations or actions of the MEMS mirrors are possible.

Various example embodiments of the innovative aspects are described herein. Reference is made to these examples in a non-limiting sense. They are provided to illustrate more broadly applicable implementations of the innovative aspects. Various changes may be made to the embodiments and implementations described and equivalents may be substituted without departing from the spirit and scope of the embodiments and/or implementations.

For example, while advantageously utilized with AR displays that provide images across multiple depth planes, the augmented reality content disclosed herein may also be displayed by systems that provide images on a single depth plane.

In addition, many modifications may be made to adapt a particular situation, material, composition of matter, process, process act(s) or step(s) to the objective(s), spirit or scope of the innovative aspects. Further, as will be appreciated by those with skill in the art that each of the individual variations described and illustrated herein has discrete components and features which may be readily separated from or combined with the features of any of the other several embodiments without departing from the scope or spirit of the innovative aspects. All such modifications are intended to be within the scope of claims associated with this disclosure.

The innovative aspects include methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Examples of the innovative aspects, together with details regarding material selection and manufacture have been set forth above. As for other details of the innovative aspects, these may be appreciated in connection with the above-referenced patents and publications as well as generally known or appreciated by those with skill in the art. The same may hold true with respect to method-based aspects in terms of additional acts as commonly or logically employed.

In addition, though the innovative aspects have been described in reference to several examples optionally incorporating various features, the innovative aspects are not to be limited to that which is described or indicated as contemplated with respect to each variation of the innovative aspects. Various changes may be made to the innovative aspects described and equivalents (whether recited herein or not included for the sake of some brevity) may be substituted without departing from the spirit and scope of the innovative aspects. In addition, where a range of values is provided, it is understood that every intervening value, between the upper and lower limit of that range and any other stated or intervening value in that stated range, is encompassed within the innovative aspects.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A wearable head mounted display system configured to be used by a wearer having an eye, said wearable head mounted display system comprising:
   an optical projector configured to output light to form an image;
   a plurality of waveguides configured to receive said light to direct said light into the eye of the wearer, wherein the plurality of waveguides comprises a first waveguide associated with a first depth plane, a second waveguide associated with a second depth plane different from the first depth plane, and a third waveguide associated with the first depth plane;
   a frame configured to dispose the plurality of waveguides in front of said eye; and
   a plurality of microelectromechanical systems (MEMS) mirrors disposed between the optical projector and the plurality of waveguides and configured to selectively couple said light into different waveguides in said plurality of waveguides, wherein a MEMS mirror of the plurality of MEMS mirrors is configured to move out of a light path of said light to not couple said light into a waveguide of the plurality of waveguides, the plurality of MEMS mirrors comprising:
      a first set of MEMS mirrors configured to selectively couple said light into at least the first and third waveguides associated with the first depth plane; and
      a second set of MEMS mirrors configured to selectively couple said light into at least the second waveguide associated with the second depth plane.

2. The wearable head mounted display system of claim 1, wherein the optical projector selectively outputs different color light.

3. The wearable head mounted display system of claim 1, further comprising a plurality of incoupling optical elements disposed with respect to said plurality of MEMS mirrors to receive light from said optical projector reflected off said plurality of MEMS mirrors and to couple said light received by said plurality of incoupling optical elements into one of the waveguides from said plurality of waveguides associated with an incoupling optical element of the plurality of incoupling optical elements such that said light propagates along said waveguide by total internal reflection.

4. The wearable head mounted display system of claim 3, further comprising a plurality of outcoupling optical elements associated with the plurality of waveguides, the plurality of outcoupling optical elements being configured to redirect light from the plurality of waveguides out of the plurality of waveguides.

5. The wearable head mounted display system of claim 4, wherein at least some outcoupling optical elements of the plurality of outcoupling optical elements comprise a diffractive optical element.

6. The wearable head mounted display system of claim 3, wherein at least some incoupling optical elements of the plurality of incoupling optical elements comprise a diffractive optical element.

7. The wearable head mounted display system of claim 3, wherein the first set of MEMS mirrors overlays a first incoupling optical element of the first waveguide and the second set of MEMS mirrors overlays a second incoupling optical element of the second waveguide.

8. The wearable head mounted display system of claim 1, wherein a number of the plurality of MEMS mirrors is equal to a number of the plurality of waveguides.

9. The wearable head mounted display system of claim 1, wherein the optical projector outputs at least two different colors of light, wherein a number of the plurality of MEMS mirrors is less than a number of the plurality of waveguides, and wherein at least one mirror of the plurality of MEMS mirrors extends in a vertical or horizontal direction to simultaneously couple light of the at least two different colors into a set of waveguides of the plurality of waveguides associated with a particular depth plane.

10. The wearable head mounted display system of claim 1, wherein MEMS mirrors of the plurality of MEMS mirrors are configured to flip out of a plane of a surface parallel to a surface of the plurality of waveguides by an angle $\theta$ having a value between about 30 degrees and about 60 degrees.

11. The wearable head mounted display system of claim 1, wherein MEMS mirrors of the plurality of MEMS mirrors are configured to linearly slide in and out of said light path of the output light.

12. The wearable head mounted display system of claim 1, wherein the plurality of waveguides is included in an eyepiece configured to be disposed in front of the eye of the wearer, the eyepiece being transparent such that light from an external environment in front of the wearer is transmitted through the eyepiece into the eye.

13. The wearable head mounted display system of claim 1, wherein the plurality of MEMS mirrors is arranged in a layer disposed on the plurality of waveguides.

14. The wearable head mounted display system of claim 1, wherein the wearable head mounted display system comprises eyewear.

15. A wearable head mounted display system configured to be used by a wearer having an eye, said wearable head mounted display system comprising:
   an optical projector configured to output light to form an image;
   a plurality of waveguides configured to receive said light to direct said light into the eye of the wearer, wherein the plurality of waveguides comprises at least a first waveguide associated with a first depth plane and at least a second waveguide associated with a second depth plane different from the first depth plane;
a frame configured to dispose the plurality of waveguides in front of said eye;
a plurality of microelectromechanical systems (MEMS) mirrors disposed between the optical projector and the plurality of waveguides and configured to selectively couple said light into different waveguides in said plurality of waveguides, wherein a MEMS mirror of the plurality of MEMS mirrors is configured to move out of a light path of said light to not couple said light into a waveguide of the plurality of waveguides, the plurality of MEMS mirrors comprising:
  a first set of MEMS mirrors configured to selectively couple said light into at least the first waveguide associated with the first depth plane; and
  a second set of MEMS mirrors configured to selectively couple said light into at least the second waveguide associated with the second depth plane; and
a plurality of incoupling optical elements disposed with respect to said plurality of MEMS mirrors to receive light from said optical projector reflected off said plurality of MEMS mirrors and to couple said light received by said plurality of incoupling optical elements into one of the waveguides from said plurality of waveguides associated with an incoupling optical element of the plurality of incoupling optical elements such that said light propagates along said waveguide by total internal reflection, wherein the first set of MEMS mirrors overlays a first incoupling optical element of the first waveguide and the second set of MEMS mirrors overlays a second incoupling optical element of the second waveguide.

16. The wearable head mounted display system of claim 15, wherein the optical projector outputs at least two different colors of light, wherein a number of the plurality of MEMS mirrors is less than a number of the plurality of waveguides, and wherein at least one mirror of the plurality of MEMS mirrors extends in a vertical or horizontal direction to simultaneously couple light of the at least two different colors into a set of waveguides of the plurality of waveguides associated with a particular depth plane.

17. The wearable head mounted display system of claim 15, wherein MEMS mirrors of the plurality of MEMS mirrors are configured to flip out of a plane of a surface parallel to a surface of the plurality of waveguides by an angle θ having a value between about 30 degrees and about 60 degrees.

18. The wearable head mounted display system of claim 15, wherein MEMS mirrors of the plurality of MEMS mirrors are configured to linearly slide in and out of said light path of the output light.

19. The wearable head mounted display system of claim 15, wherein the plurality of MEMS mirrors is arranged in a layer disposed on the plurality of waveguides.

20. A wearable head mounted display system configured to be used by a wearer having an eye, said wearable head mounted display system comprising:
an optical projector configured to output light to form an image, wherein the optical projector outputs at least two different colors of light;
a plurality of waveguides configured to receive said light to direct said light into the eye of the wearer, wherein the plurality of waveguides comprises at least a first waveguide associated with a first depth plane and at least a second waveguide associated with second depth plane different from the first depth plane;
a frame configured to dispose the plurality of waveguides in front of said eye; and
a plurality of microelectromechanical systems (MEMS) mirrors disposed between the optical projector and the plurality of waveguides and configured to selectively couple said light into different waveguides in said plurality of waveguides, wherein a MEMS mirror of the plurality of MEMS mirrors is configured to move out of a light path of said light to not couple said light into a waveguide of the plurality of waveguides, the plurality of MEMS mirrors comprising:
  a first set of MEMS mirrors configured to selectively couple said light into at least the first waveguide associated with the first depth plane; and
  a second set of MEMS mirrors configured to selectively couple said light into at least the second waveguide associated with the second depth plane,
wherein a number of the plurality of MEMS mirrors is less than a number of the plurality of waveguides, and wherein at least one mirror of the plurality of MEMS mirrors extends in a vertical or horizontal direction to simultaneously couple light of the at least two different colors into a set of waveguides of the plurality of waveguides associated with a particular depth plane.

* * * * *